United States Patent
Cominetti et al.

(10) Patent No.: US 8,823,237 B2
(45) Date of Patent: Sep. 2, 2014

(54) ELECTRIC MACHINE HAVING A STATOR WINDING WITH RIGID BARS, AND RELATED METHOD OF CONSTRUCTION

(75) Inventors: Paolo Cominetti, Bologna (IT); Franco Ciampolini, Bologna (IT); Vincenzo Giorgianni, Forli (IT)

(73) Assignee: Magneti Marelli S.p.A., Corbetta (IT)

(*) Notice: Subject to any disclaimer, the term of this patent is extended or adjusted under 35 U.S.C. 154(b) by 210 days.

(21) Appl. No.: 13/248,085

(22) Filed: Sep. 29, 2011

(65) Prior Publication Data
US 2012/0104885 A1 May 3, 2012

(30) Foreign Application Priority Data

Sep. 29, 2010 (IT) ............................... BO2010A0583

(51) Int. Cl.
*H02K 3/04* (2006.01)
*H02K 11/00* (2006.01)
*H02K 15/00* (2006.01)
*H02K 3/50* (2006.01)
*H02K 3/12* (2006.01)

(52) U.S. Cl.
CPC .................. *H02K 3/12* (2013.01); *H02K 3/505* (2013.01); *H02K 2211/03* (2013.01)
USPC ................ 310/201; 310/71; 310/208; 29/596

(58) Field of Classification Search
CPC ..................................... H02K 3/04; H02K 3/14
USPC ................... 310/71, 201, 208, 179, 180, 195; 29/596, 598
See application file for complete search history.

(56) References Cited

U.S. PATENT DOCUMENTS 5,717,273 A * 2/1998 Gulbrandson et al. ......... 310/260
6,490,779 B1 * 12/2002 Tokizawa et al. ............... 29/596
(Continued)

FOREIGN PATENT DOCUMENTS

EP          1727260 A2      11/2006

OTHER PUBLICATIONS

Aug. 23, 2011 Search Report for Italian Patent App. No. B02010A 000583.

*Primary Examiner* — Tran Nguyen
*Assistant Examiner* — Thomas Truong
(74) *Attorney, Agent, or Firm* — Howard & Howard Attorneys PLLC

(57) ABSTRACT

An electric machine includes a stator having a magnetic core crossed longitudinally by a stator slot and stator winding having a phase and series of rigid, U-shaped bars inserted through the slot. The slot defines "entry" and "exit" sides in which cusps and legs of the bars are placed. The legs coming out the "exit" side are twisted through relative double folds each of which defines internal and external folds in opposite directions. Ends of the legs are electrically connected to each other to form electrical paths of the winding. A width of the cusps is identical for the bars. The ends of a pair in a part of the winding are initially not adjacent to each other and folded toward each other to be arranged parallel to each other in a circumferential direction so that the ends touch each other to allow an electrical connection between the ends.

15 Claims, 17 Drawing Sheets

(56) References Cited

U.S. PATENT DOCUMENTS

| | | | |
|---|---|---|---|
| 6,538,356 B1* | 3/2003 | Jones | 310/216.001 |
| 6,700,236 B2* | 3/2004 | Umeda et al. | 310/54 |
| 6,862,796 B2* | 3/2005 | Kato | 29/596 |
| 7,205,689 B2* | 4/2007 | Lukenich | 310/71 |
| 2003/0024101 A1 | 2/2003 | Tokizawa et al. | |
| 2003/0030344 A1* | 2/2003 | Hatz et al. | 310/179 |
| 2003/0214190 A1* | 11/2003 | Congdon et al. | 310/71 |
| 2008/0136274 A1* | 6/2008 | Fujii et al. | 310/71 |
| 2011/0012472 A1* | 1/2011 | Umeda et al. | 310/207 |

* cited by examiner

ELECTRIC MACHINE HAVING A STATOR WINDING WITH RIGID BARS, AND RELATED METHOD OF CONSTRUCTION

REFERENCE TO RELATED APPLICATION

This application claims benefit of the filing date of and priority to Italian Patent Application BO2010A 000583 filed on Sep. 29, 2010.

BACKGROUND OF INVENTION

1. Field of Invention

The invention relates, generally, to an electric machine and, more particularly, to such a machine that has a stator winding with rigid bars and a method of construction thereof.

2. Description of Related Art

Traditionally, the stator winding of an electric machine is made by filiform and flexible conductors that are initially coil-wound. Then, the coils are telescoped into the stator slots and are, hence, electrically connected to one another. Such a construction method is complex to automate as it is very difficult to automatically telescope the coils inside the stator slots as the coils do not have a stable shape and should be deformed to pass through the small axial aperture of the slots.

To overcome the construction difficulties of the stator winding made by filiform and flexible conductors, a stator winding made by rigid bars was proposed. In a stator winding made by rigid bars, a series of rigid bars are used that are initially "U"-shaped and, hence, axially telescoped into the stator slots—thus forming an entry side, in which the cusps of the "U"-shaped bars are arranged, and an exit side, in which the legs (i.e., the straight sections) of the "U"-shaped bars are arranged. Once all the bars have been telescoped into the stator slots, the legs on the exit side are twisted (by an operation called "twisting"), and, hence, the free ends of the legs are connected to one another by welding to form the electrical paths of the stator winding.

It has been proposed to differentiate the sizes of the cusps of the "U"-shaped bars in such a way to obtain, due to such a differentiation, the electrical paths of the stator winding 8. However, differentiating the sizes of the cusps of the "U"-shaped bars involves significant complications both in making the "U"-shaped bars (as at least two different types of "U"-shaped bars should be made) and inserting the "U"-shaped bars into the stator slots (as there is a need to manage at least two different types of "U"-shaped bars that have to be telescoped into accurate and predetermined positions and are in no way interchangeable with each other).

During the construction of the stator winding, it has been proposed to unite all the "U"-shaped bars at the outside of the stator magnetic core and, hence, insert all the "U"-shaped bars into the stator slots with a single movement. However, a push of high intensity is simultaneously exercised on all the "U"-shaped bars, and, hence, it is possible that one or more "unfortunate" "U"-shaped bars is/are subjected to an excessive push (i.e., too strong) and/or improperly directed, which induces damage to the external insulating enamel that covers the "U"-shaped bars themselves.

Patent Application US2003024101A1 describes an electric machine having a stator winding with rigid bars and a related method of construction.

Thus, there is a need in the related art for an electric machine having a stator winding with rigid bars and a method of construction thereof. More specifically, there is a need in the related art for such electric machine and method that are easy and affordable to obtain.

SUMMARY OF INVENTION

The invention overcomes the disadvantages in the related art in an electric machine that defines a substantially central axis of rotation and includes a stator having a magnetic core crossed substantially longitudinally by at least one stator slot and a stator winding having at least one phase and series of rigid bars that are substantially "U"-shaped and inserted through the stator slot. The stator slot defines an entry side in which cusps of the bars are placed and an exit side in which legs of the bars are placed. The legs coming out from the exit side are twisted through relative double folds each of which defines an internal fold in one direction and an external fold in a substantially opposite direction. Ends of the legs are electrically connected to each other to form electrical paths of the stator winding. A width of the cusps is substantially identical for the bars. The ends of at least a first pair of the legs in a part of the stator winding of the phase are initially not adjacent with respect to each other and folded toward each other to be arranged substantially parallel to each other in a substantially circumferential direction so that the ends touch each other to allow an electrical connection between the ends.

The invention overcomes the disadvantages in the related art also in a method of construction of the electric machine. The machine includes a stator having a magnetic core crossed substantially longitudinally by at least one stator slot and a stator winding having at least one phase and series of rigid bars that are substantially "U"-shaped and inserted through the stator slot defining an entry side in which cusps of the bars are placed and an exit side in which legs of the bars are placed. The method comprises steps of twisting the legs coming out the exit side through corresponding double folds each of which defines an internal fold in one direction and an external fold in a substantially opposite direction, electrically connecting the ends of the legs to each other to form electrical paths of the stator winding, carrying out the bars so that a width of the cusps is substantially identical for the bars, and folding the ends initially not adjacent with respect to each other of at least a first pair of the legs in a part of the stator winding of the phase toward each other to be arranged substantially parallel to each other in a substantially circumferential direction so that the ends touch each other to allow an electrical connection between the ends.

One advantage of the electric machine having a stator winding with rigid bars and method of construction of the electric machine of the invention is that it is easy and affordable to obtain.

Another advantage of the electric machine having a stator winding with rigid bars and method of construction of the electric machine of the invention is that electrical paths of the stator winding are easily and quickly obtained and easily automatable.

Another advantage of the electric machine having a stator winding with rigid bars and method of construction of the electric machine of the invention is that it can decrease stresses to which the bars are subjected during insertion, thus avoiding possible damage to external insulating enamel that coats the bars.

Another advantage of the electric machine having a stator winding with rigid bars and method of construction of the electric machine of the invention is that each bar is individually pushed and, hence, it is possible to accurately calibrate maximum pushing force exercisable on the bar and apply small corrections to a "pushing" direction to consider certain specificities of the bar.

Another advantage of the electric machine having a stator winding with rigid bars and method of construction of the electric machine of the invention is that it improves quality of the corresponding internal folds of the double folds of the legs.

Another advantage of the electric machine having a stator winding with rigid bars and method of construction of the electric machine of the invention is that it prevents the legs 10 at the corresponding internal folds of the double folds of the legs from accidentally touching the stator magnetic core against which it is easy to damage the external insulating enamel that covers the bars.

Other objects, features, and advantages of the electric machine having a stator winding with rigid bars and method of construction of the electric machine of the invention are readily appreciated as the electric machine and method become more understood while the subsequent detailed description of at least one embodiment of each of the electric machine and method is read taken in conjunction with the accompanying drawing thereof.

BRIEF DESCRIPTION OF EACH FIGURE OF DRAWING

Figure 2:
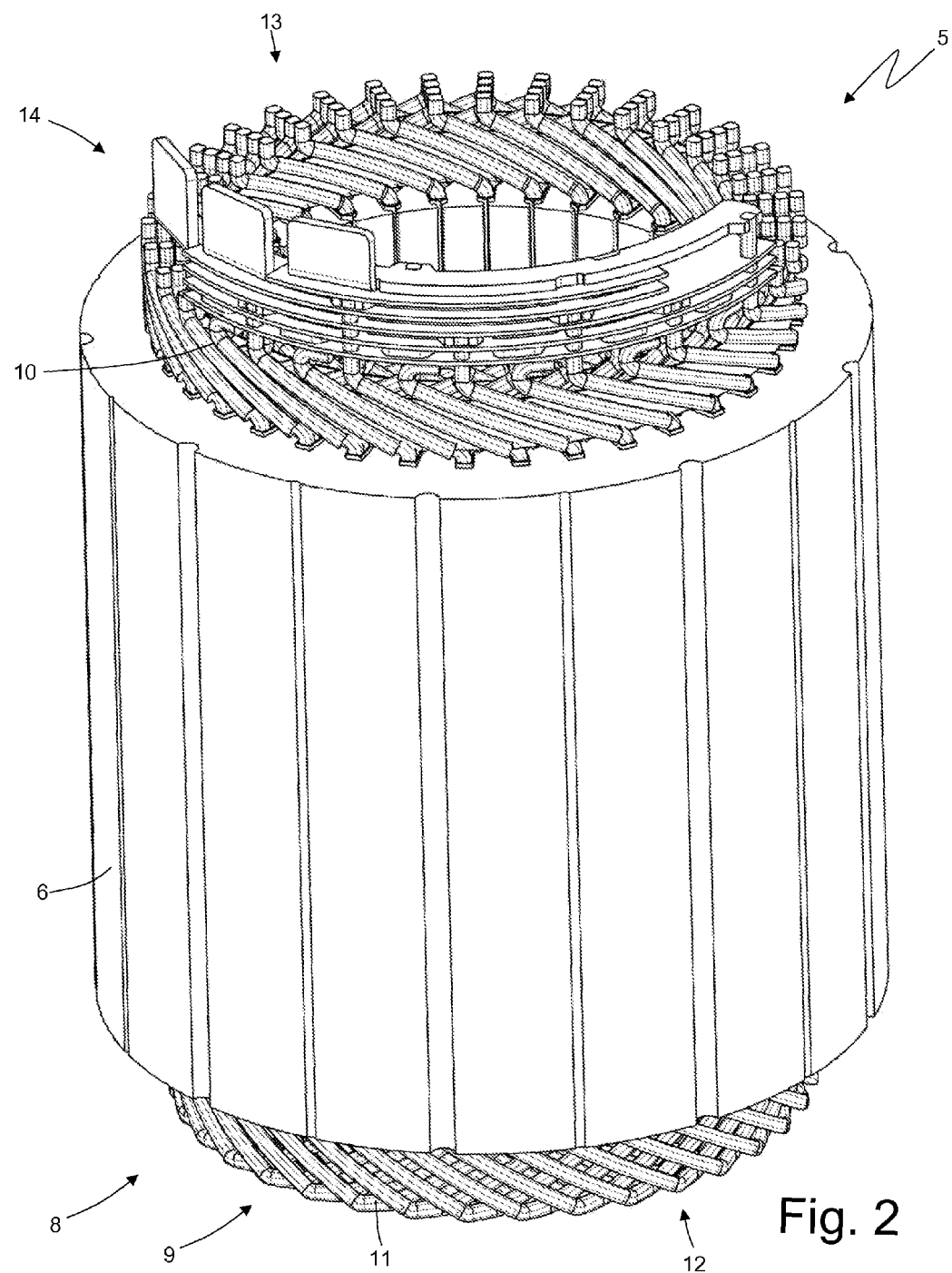
FIG. 2 is a perspective diagrammatic view, with parts removed for clarity, of a stator of the embodiment of the electric machine illustrated in FIG. 1.
Figure 6:
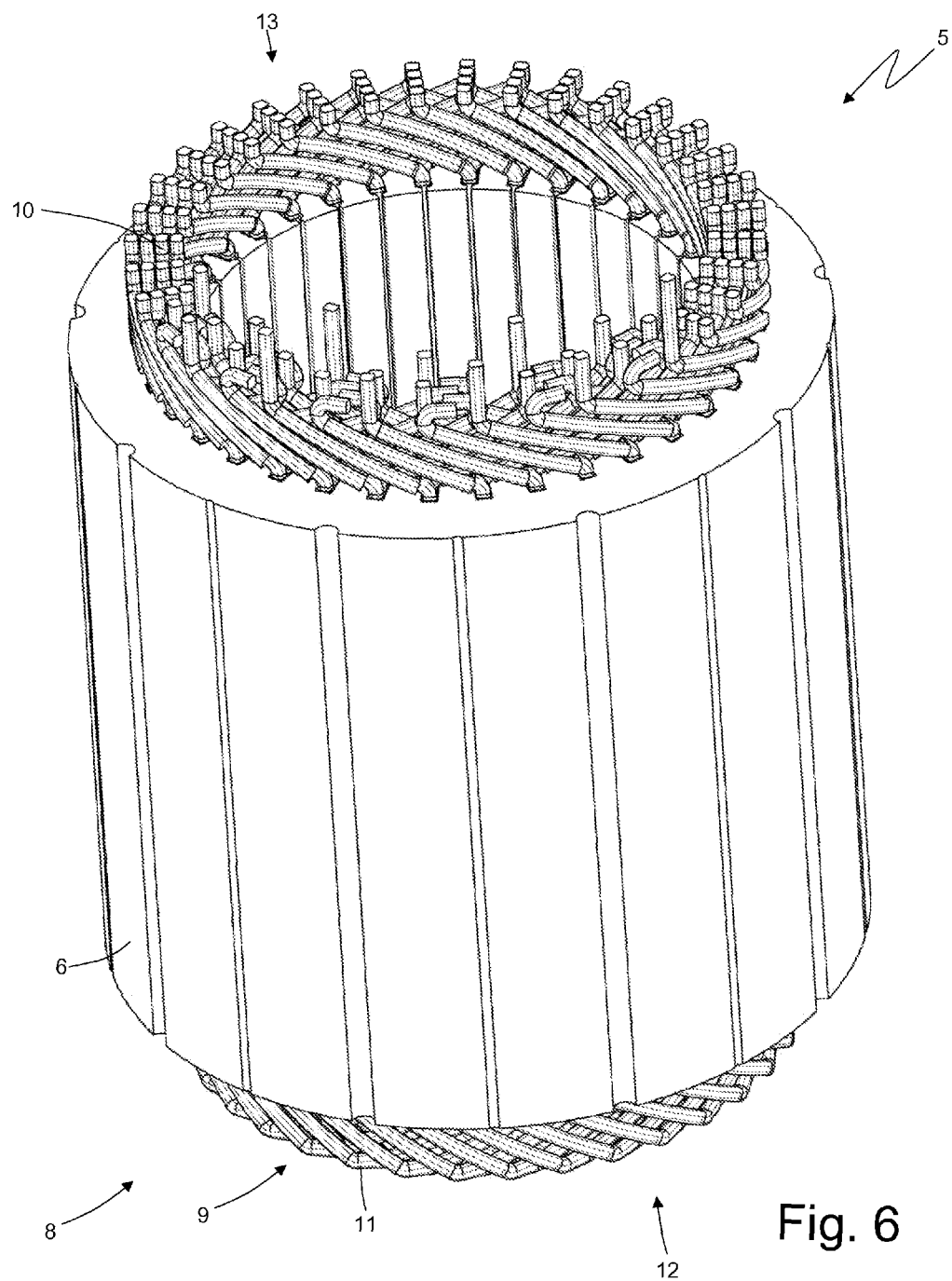
Figure 7:
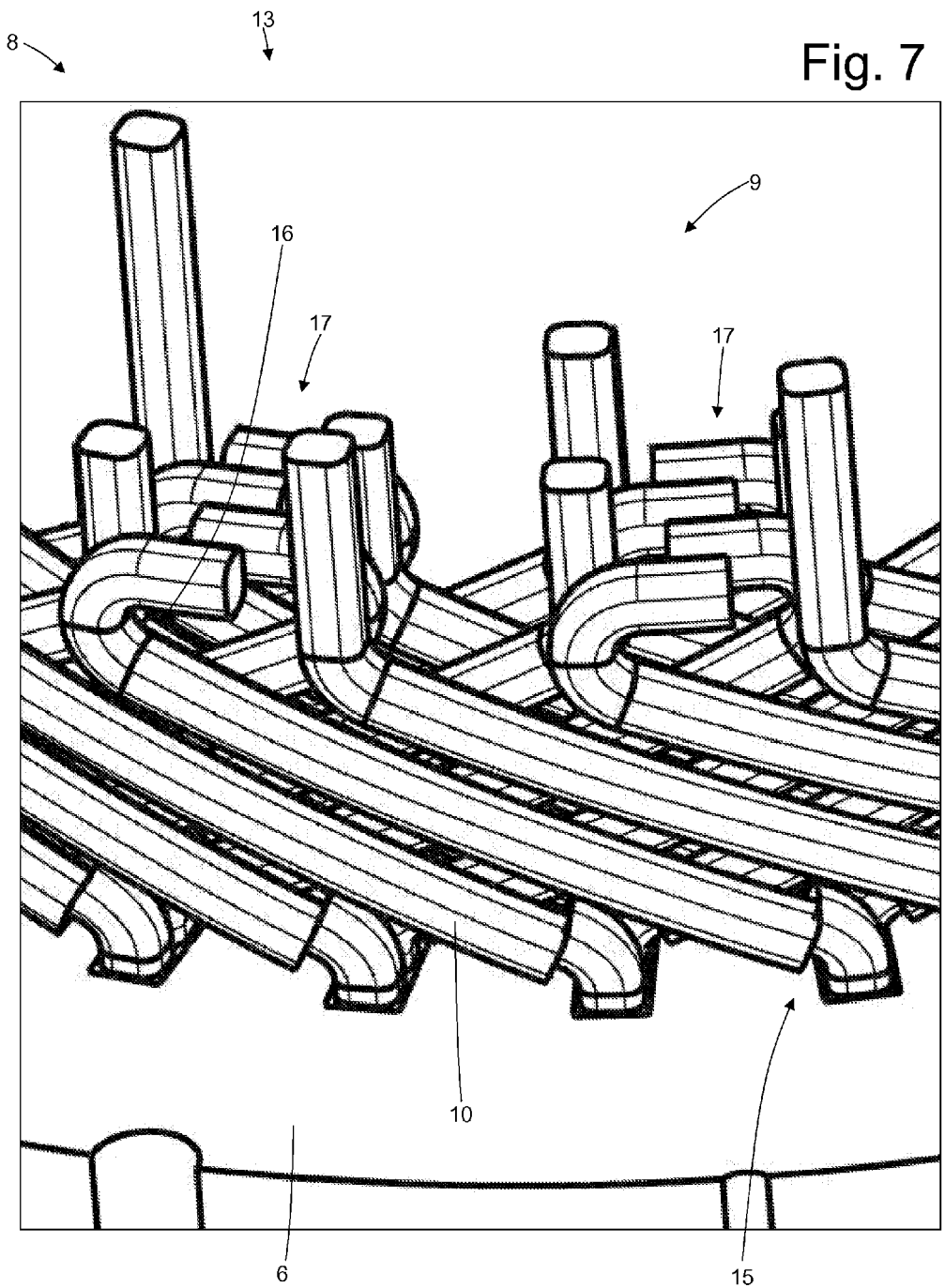
Figure 8:
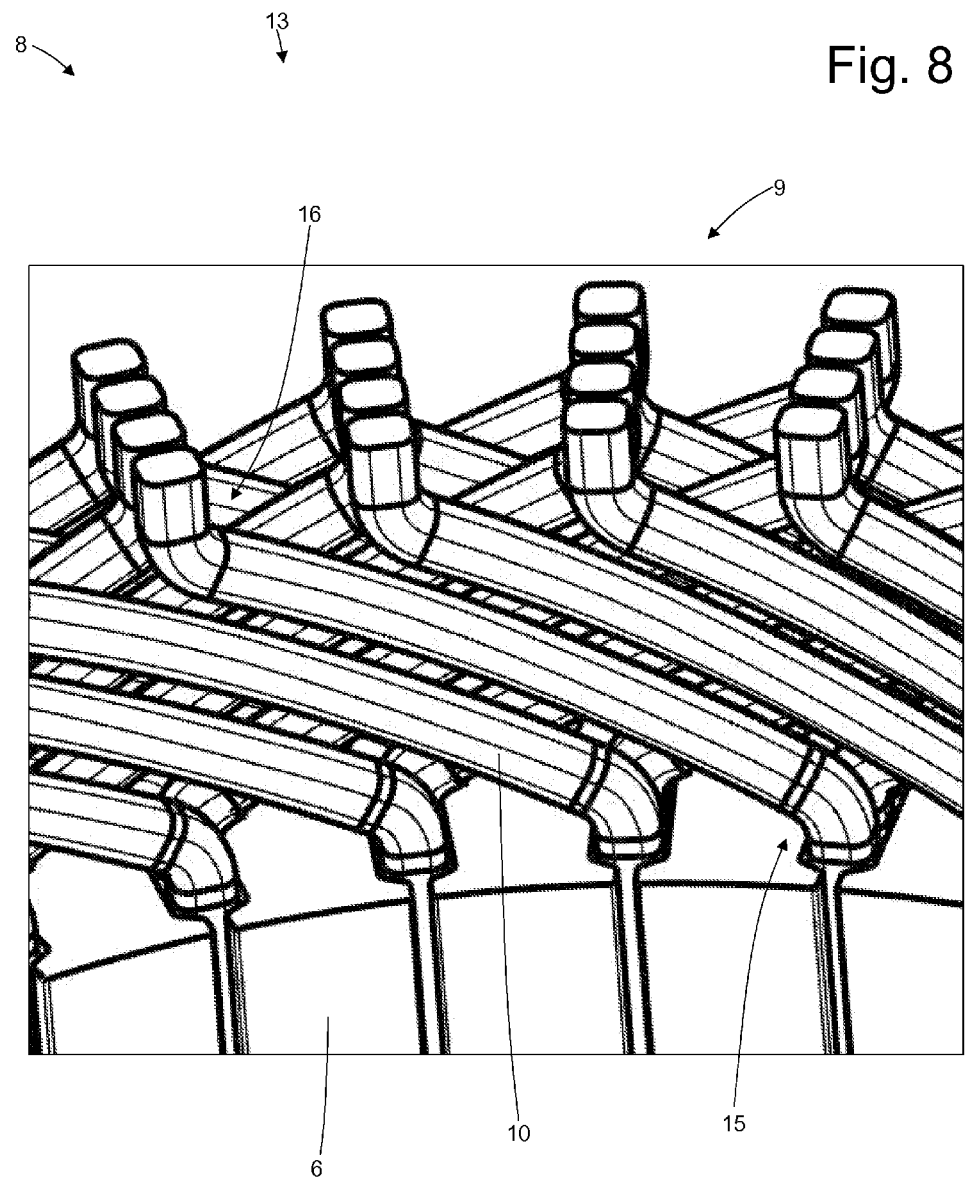
Figure 9:
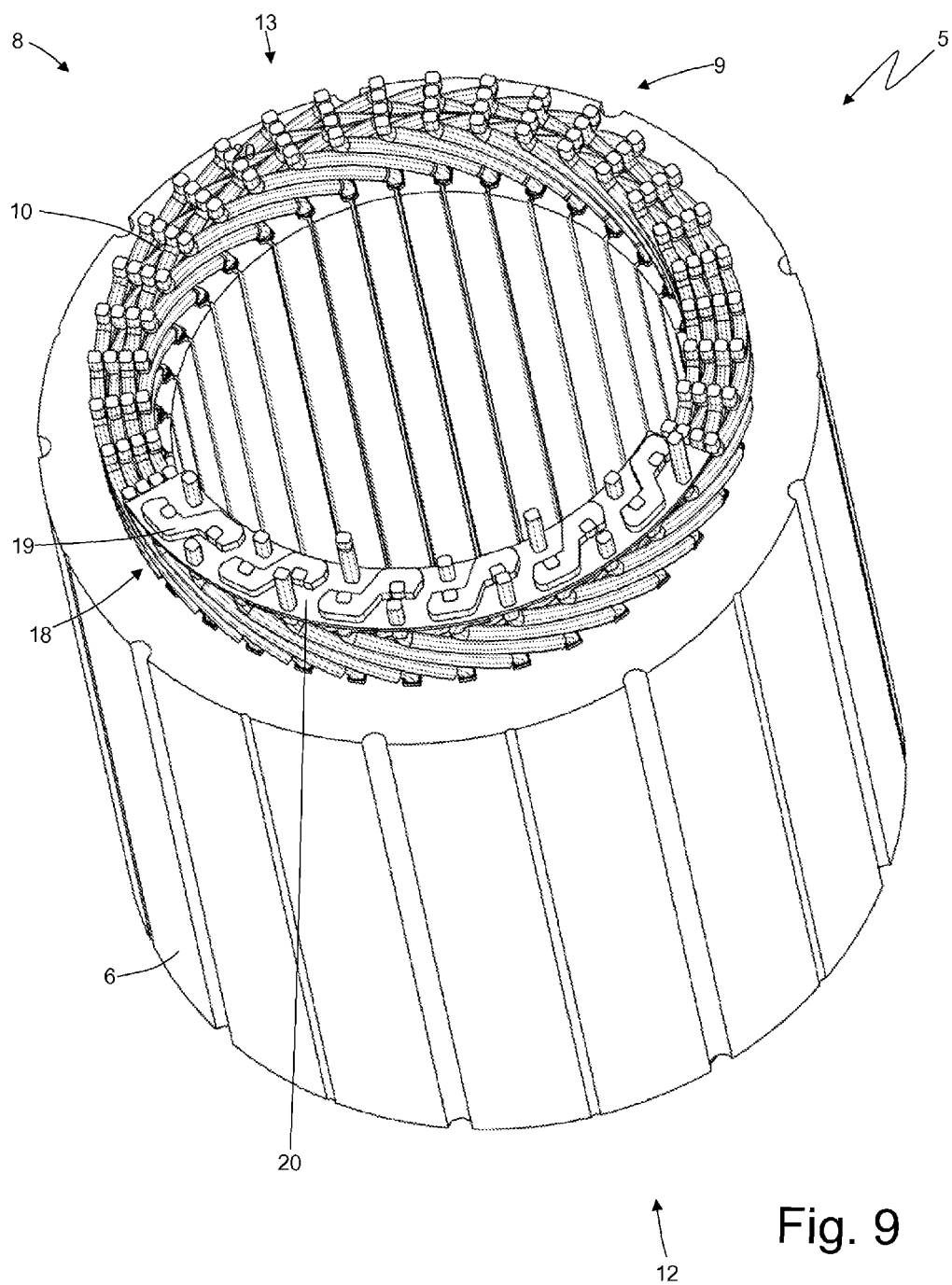
Figure 10:
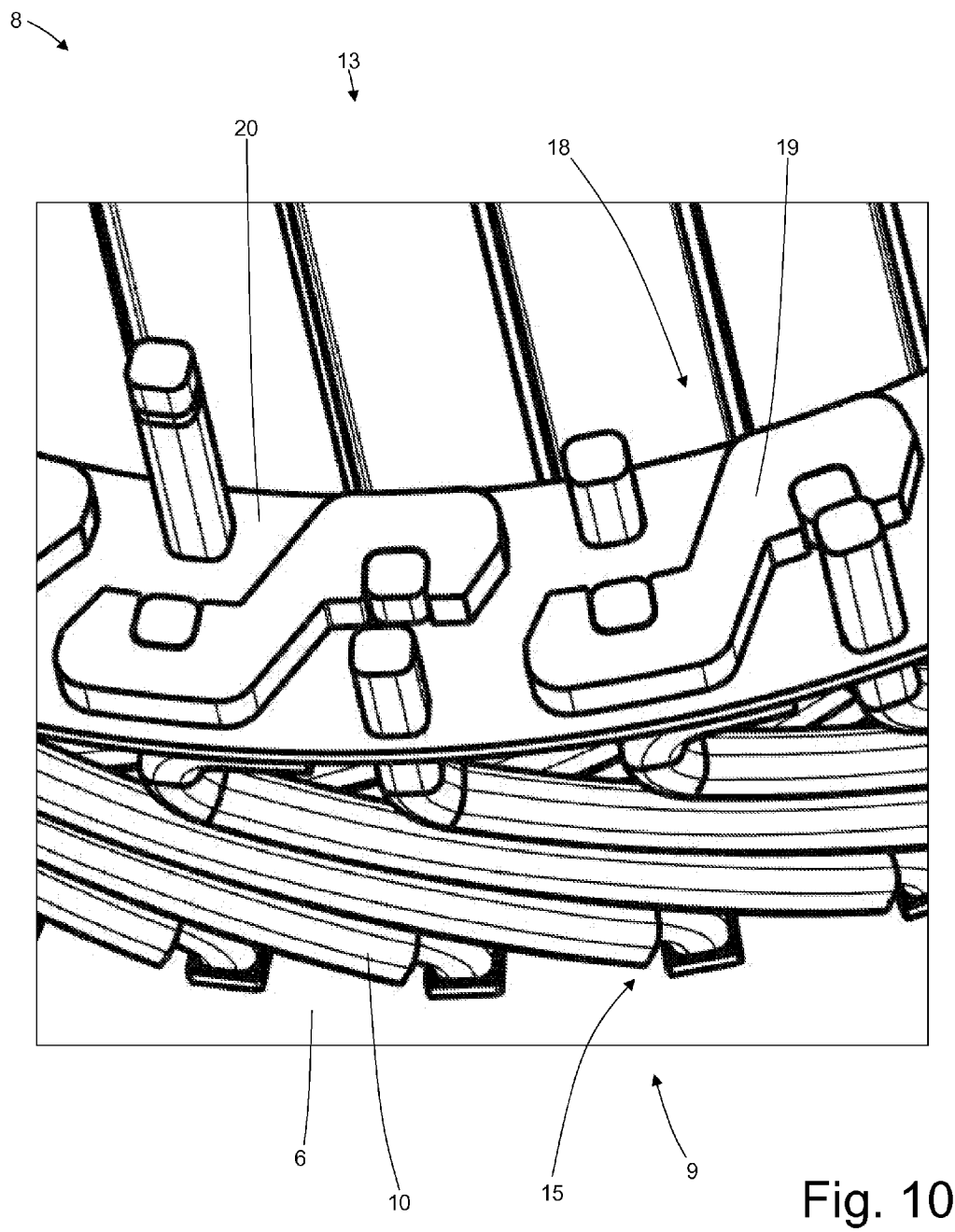
Figure 15:
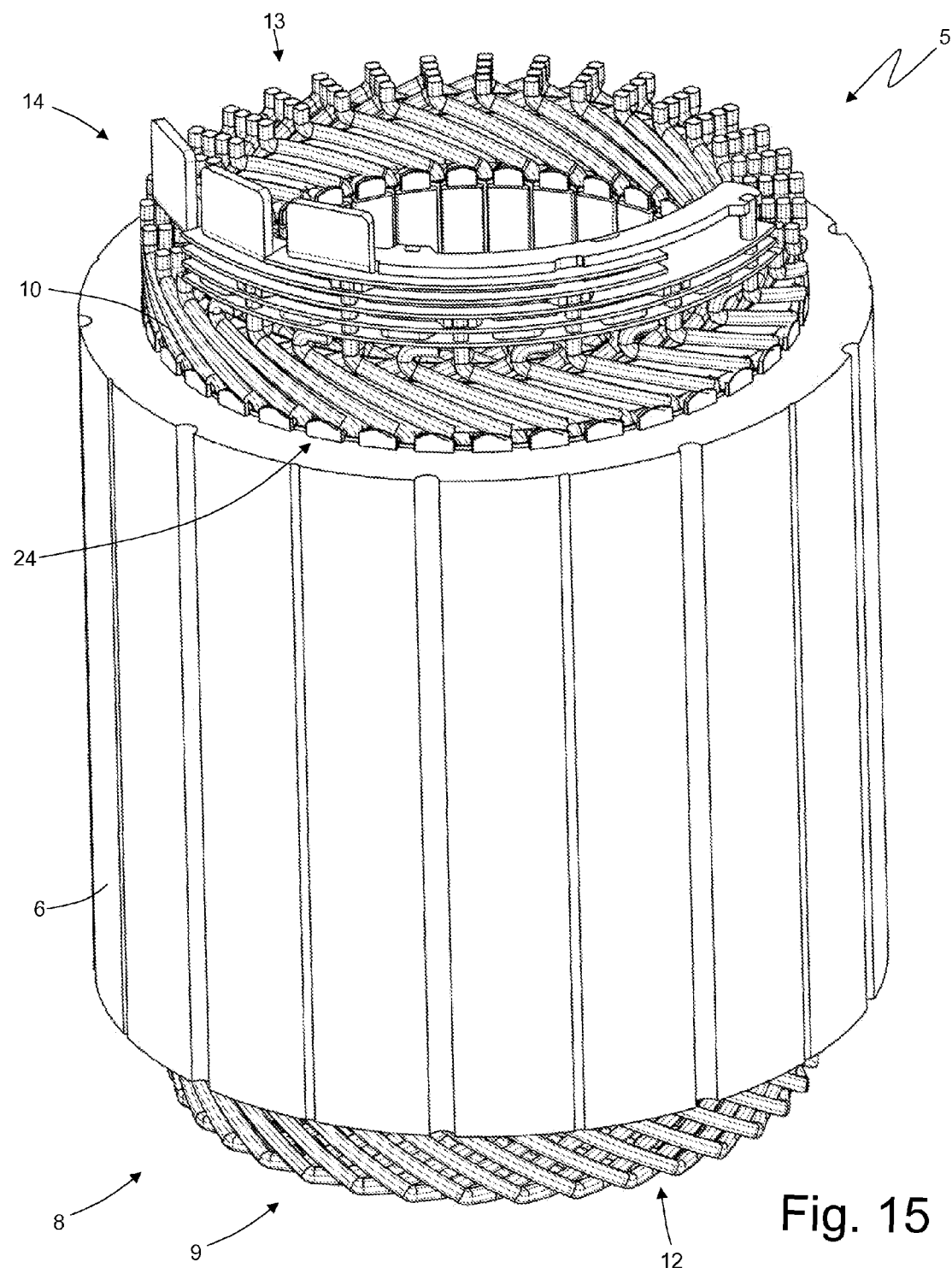
Figure 16:
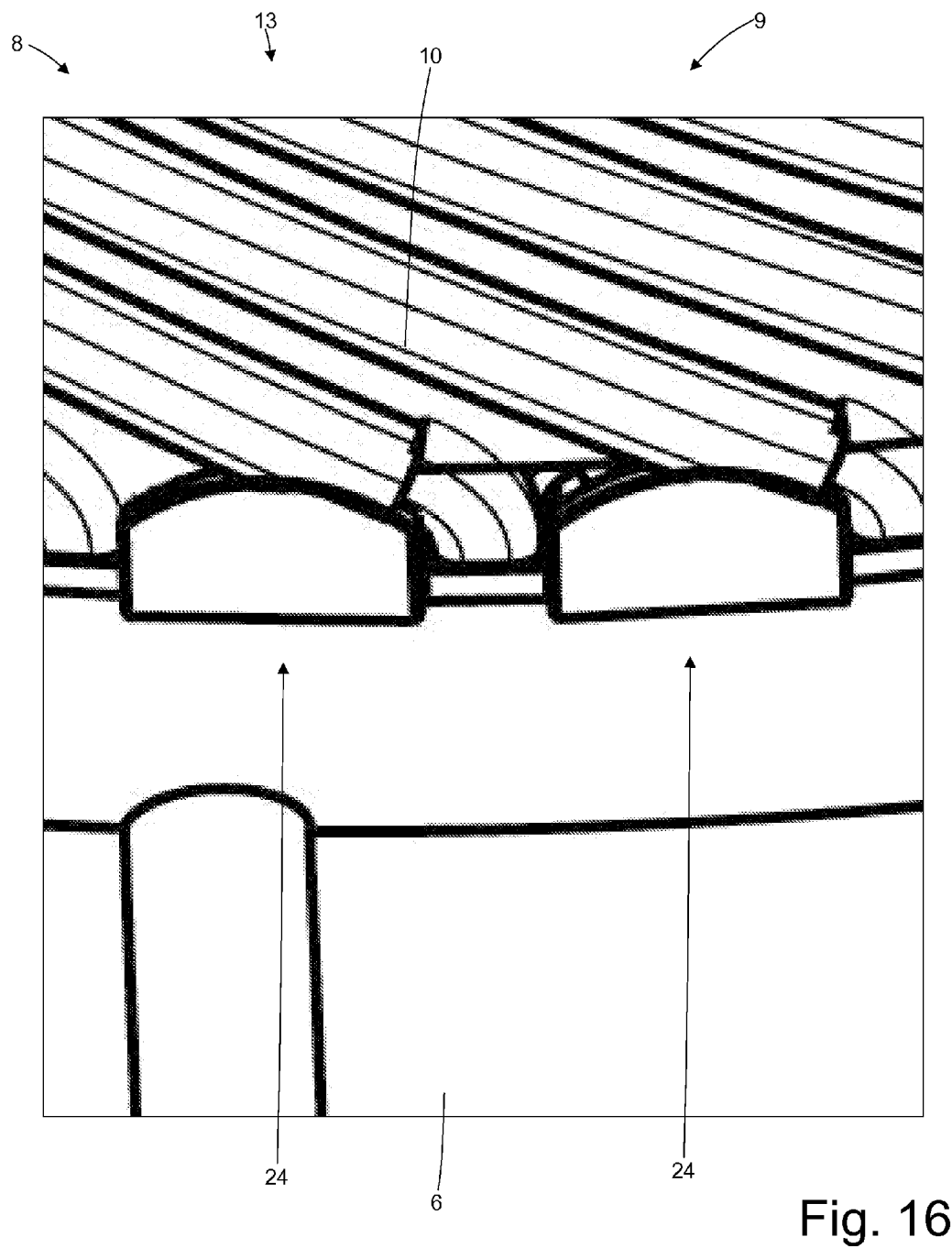

FIGS. 4-6, 9, and 11-14 are a succession of perspective diagrammatic views, with parts removed for clarity, of the steps of the method of construction of the stator winding of the embodiment of the stator illustrated in FIG. 2;

FIGS. 7 and 8 are two views on an enlarged scale of respective details illustrated in FIG. 6;

FIG. 10 is a view on an enlarged scale of a detail illustrated in FIG. 9;

FIG. 15 is a perspective diagrammatic view, with parts removed for clarity, of another embodiment of the stator illustrated in FIG. 2;

FIG. 16 is a view on an enlarged scale of a detail illustrated in FIG. 15; and

Figure 17:
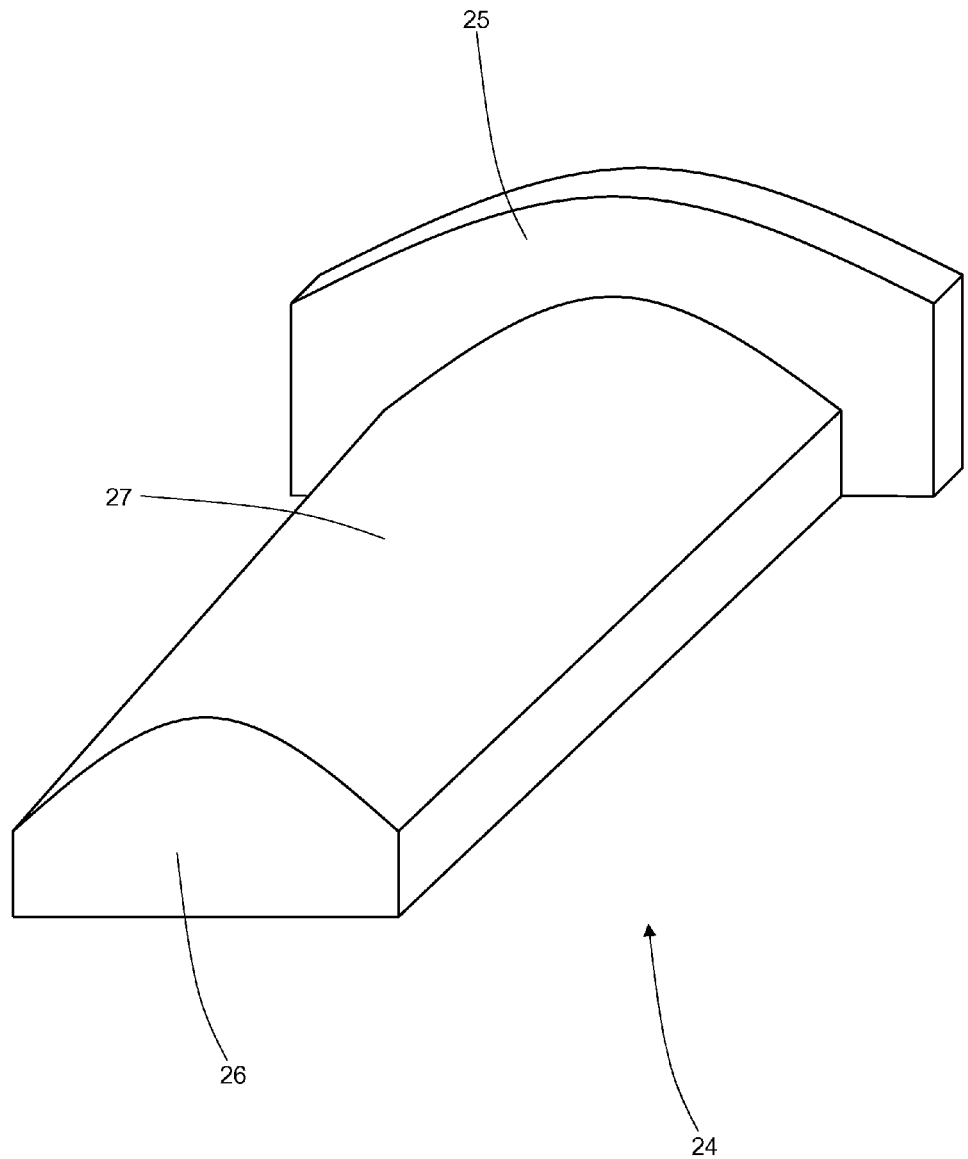

FIG. 17 is a perspective view on an enlarged scale of a tile-shaped plate of the embodiment of the stator illustrated in FIG. 15.

DETAILED DESCRIPTION OF EMBODIMENT(S) OF INVENTION

Figure 1:
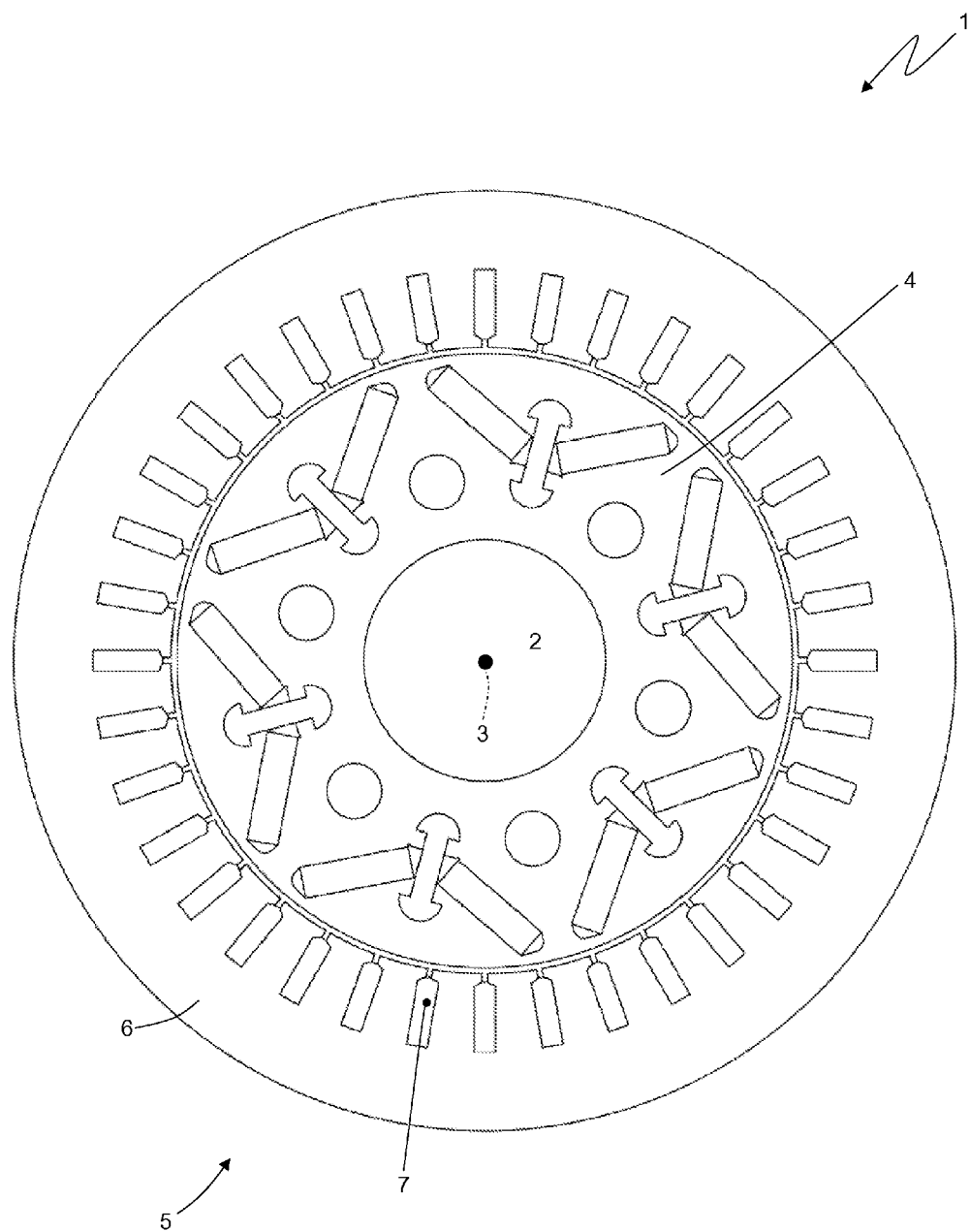
FIG. 1 is a cross-section diagrammatic view, with parts removed for clarity, of an electric machine having a stator winding with rigid bars made according to an embodiment of the invention.

In FIG. 1, a synchronous electric machine is generally indicated at 1 for auto-traction of reversible type [i.e., it may operate both as an electric motor (by absorbing electrical power and generating a mechanical driving torque) and electric generator by absorbing mechanical energy and generating electrical power]. The electric machine 1 includes a shaft 2, which is rotatably mounted to rotate about a central axis of rotation 3, a rotor 4 with permanent magnets keyed to shaft 2 to rotate together with shaft 2 itself, and a cylindrical tubular stator 5 arranged about rotor 4 to enclose rotor 4 itself therein.

Stator 5 includes a magnetic core 6 that consists of a series of sandwiched sheets and has a centrally-holed tubular shape. The magnetic core 6 is longitudinally crossed by thirty-six stator slots 7 that are uniformly distributed along the internal side of the magnetic core 6 and accommodate a three-phase stator winding 8 (illustrated in FIG. 2). In the embodiment illustrated in the accompanying figures, the three-phase stator winding 8 is distributed in thirty-six stator slots 7, and rotor 4 with permanent magnets includes six poles. Accordingly, the synchronous electric machine 1 has two slots per pole and per phase.

Figure 3:
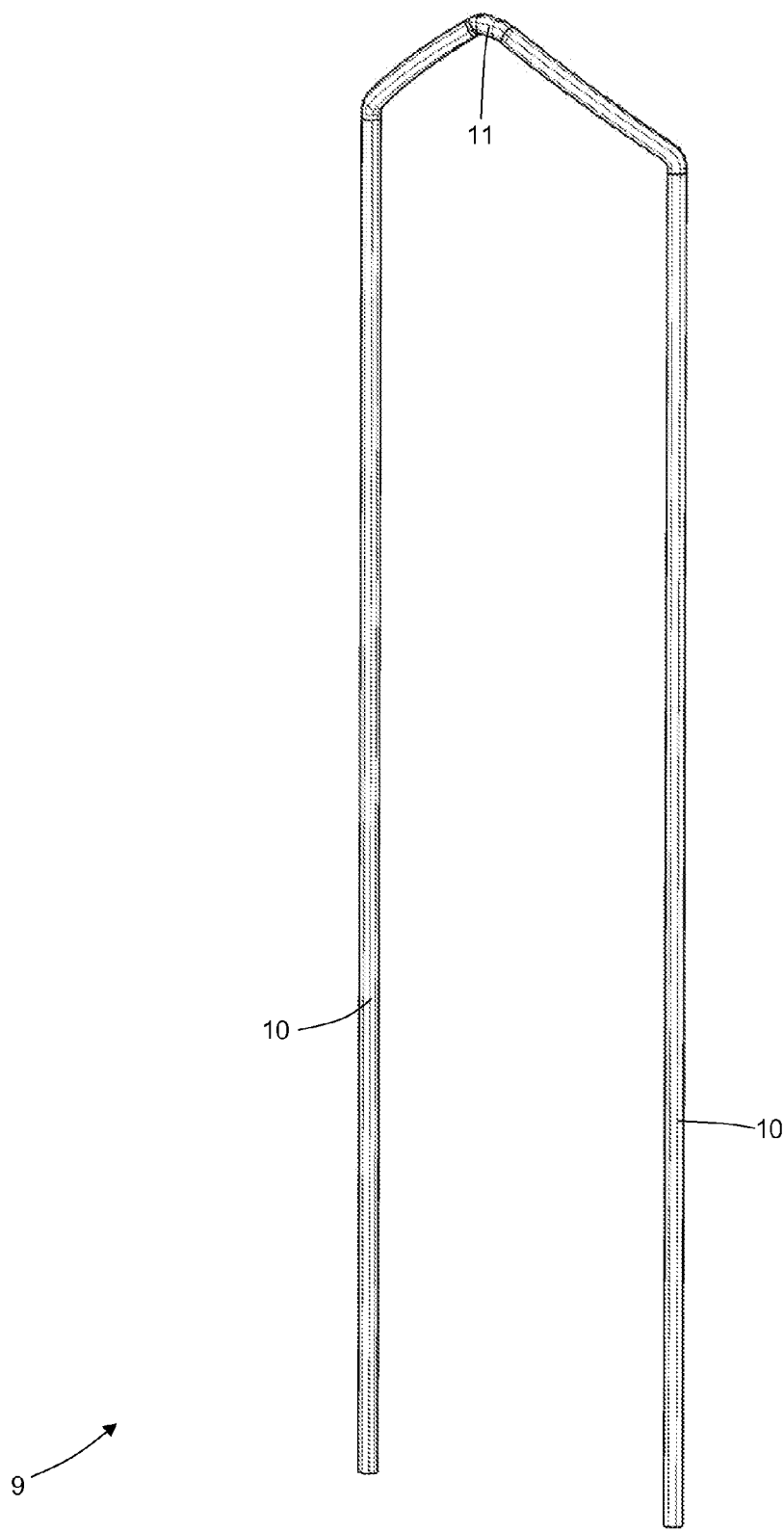
FIG. 3 is a perspective and diagrammatic view of a folded rigid "U"-shaped bar of a stator winding of the embodiment of the stator illustrated in FIG. 2.

As shown in FIG. 2, the three-phase stator winding 8 includes a series of rigid "U"-shaped bars 9, each of which includes two legs 10 connected to each other by a cusp 11 (as better shown in FIG. 3). The two legs 10 of a same bar 9 constitute two corresponding conductors of the stator winding 8. It is worth noting that each "U"-shaped bar 9 has a "three-dimensional" fold, i.e., including a fold on two perpendicular planes. The "U"-shaped bars 9 are inserted through the stator slots 7, thus defining an entry side 12, in which the cusps 11 of the "U"-shaped bars 9 are arranged, and an exit side 13, in which the legs 10 of the "U"-shaped bars 9 are arranged. In particular, arranged in each slot are four legs 10 (i.e., four conductors of the stator winding 8) belonging to four different corresponding rigid "U"-shaped bars 9. The ends of the legs 10 of the "U"-shaped bars 9 are electrically connected to each other to form the electrical paths of the stator winding 8.

According to an embodiment, three annular-shaped insulating layers (not illustrated) of electrically insulating material (typically "Nomex®" brand insulating paper) are interposed between four circles of legs 10 that protrude from the exit side 13 of the stator magnetic core 6.

Moreover, the three-phase stator winding 8 includes three connecting terminals 14 that form the electrical interface with the outside of the stator winding 8 and are electrically connected to an electronic power converter (not illustrated) that drives the synchronous electric machine 1.

With reference to FIGS. 4-14, the method of construction of the stator winding 8 is hereinafter described.

Initially, the rigid bars 9 are centrally folded at 180° to be shaped into a "U" and take on the shape shown in FIG. 3. This fold is, for example, obtained by a numerical-control-machine tool that gives the final rigid shape to each bar 9 in one single operation. The "U"-shaped bars 9 are all the same to one another—for example, they all have exactly the same dimensions.

Once the "U"-shaped bars 9 are ready (in particular, there are seventy-two "U"-shaped bars 9 in the stator winding 8 illustrated in the accompanying figures), each "U"-shaped bar 9 is individually inserted (i.e., alone) into the corresponding two stator slots 7 (i.e., the two legs 10 of the "U"-shaped bar 9 are axially inserted into the two corresponding stator slots 7). In other words, one single "U"-shaped bar 9 at a time is inserted into the two non-adjacent stator slots 7. For example, before inserting the "U"-shaped bars 9 into the stator slots 7, each stator slot 7 is internally "coated" by an insulating layer (not illustrated) of electrically insulating material (typically "Nomex®" brand insulating paper).

Figure 4:
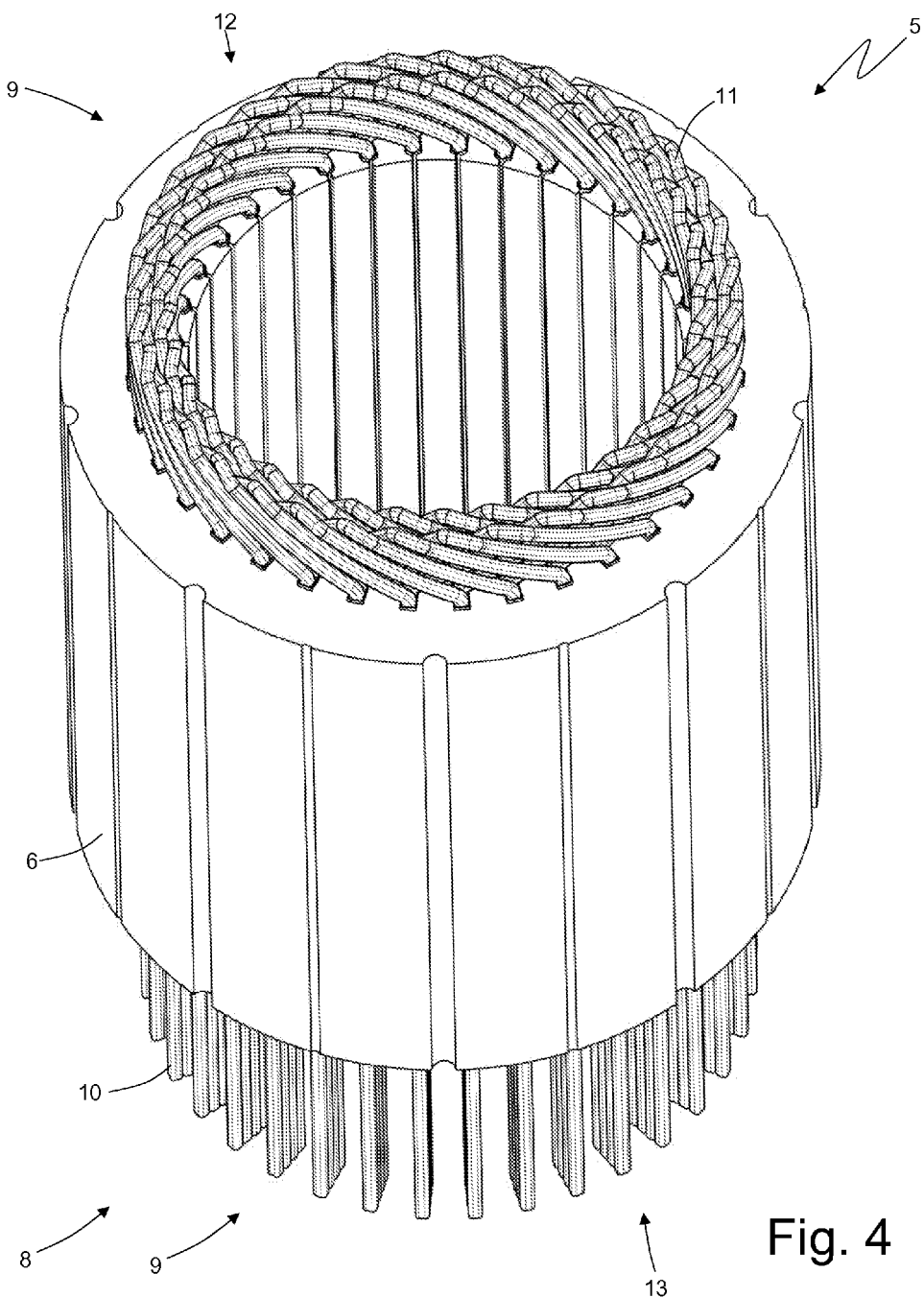
Figure 5:
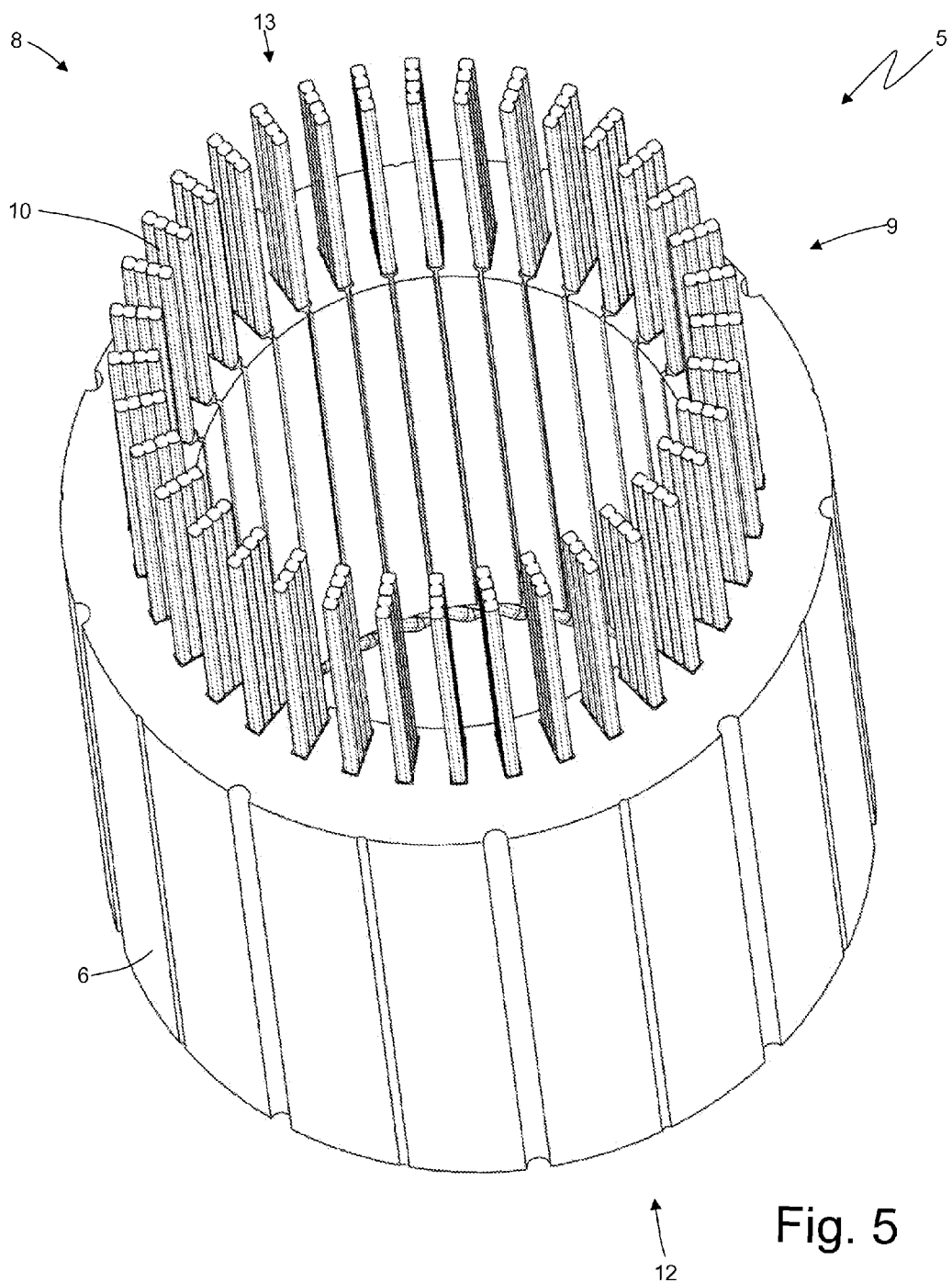

When the insertion into the stator slots 7 of all the seventy-two "U"-shaped bars 9 has been completed, the stator winding 8 appears as illustrated in FIGS. 4 and 5. At this point and as better illustrated in FIG. 6, the legs 10 of the "U"-shaped bars 9 that protrude from the exit side 13 of the magnetic core 6 are twisted by respective double folds to take on a "Z" shape. As better illustrated in the magnifications in FIGS. 7 and 8, each double fold of a leg 10 includes an internal fold 15

(i.e., closer to the magnetic core 6 of the stator 5) in one direction and an external fold 16 (for example, farther from the magnetic core 6 of stator 5) in an opposite direction. By way of example, the internal fold 15 for each leg 10 has a width of approximately 60° in one direction, and the internal fold 15 has a width of approximately 60° in the opposite direction. Arranged in each stator slot 7 are four corresponding legs 10 (belonging to four corresponding different "U"-shaped bars) that are twisted in alternating opposite directions by respective double folds. In other words, half of the legs 10 is twisted clockwise at a given width while the other half of the legs 10 is twisted counter-clockwise (i.e., in an opposite direction) at the same width. It is worth noting that all the double folds of the legs 8 have the same width (equal, in the embodiment illustrated in the accompanying figures, to a distance corresponding to three stator slots 7).

According to an embodiment, during the twisting of the legs 10 of the "U"-shaped bars 9, the legs 10 are not twisted all together, but they are twisted in groups. In other words, the legs 10 of the "U"-shaped bars 9 are divided into at least two groups that are twisted with two successive operations (i.e., not simultaneous). During the twisting of a first group of legs 10, the legs 10 in the second group, which is twisted later, are temporarily axially translated along the stator slots 7 so as to decrease the length that protrudes from the stator slots 7 on the exit side 13 (typically until cancelling or almost cancelling the length of the legs 10 that protrudes from the stator slots 7 on the exit side 13). The legs 10 of the second group are not an obstacle to the twisting of the legs 10 in the first group, rather at the same time the legs 10 in the second group engage the stator slots 7 to contribute to keeping firm the legs 10 in the first group during the twisting. At the end of the twisting of the first group of legs 10, the legs 10 in the second group are axially translated in reversed direction to return to the original position and, in turn, be twisted. The twisting of the legs 10 in the first group is simplified as such a twisting occurs without the obstacle depicted by the legs 10 in the second group. The twisting of the legs 10 in the second group is in any event simpler as it occurs when the legs 10 of the first group have already been twisted and, hence, have a much smaller axial volume.

Once the twisting of the legs 10 of the "U"-shaped bars 9 is complete, the ends of the legs 10 of the "U"-shaped bars 9 are electrically connected to one another (typically by laser welding) to form the electrical paths of the stator winding 8. It is worth noting that the two legs 10 the ends of which are electrically connected to each other are twisted in opposite directions by respective double folds.

As previously mentioned, the "U"-shaped bars 9 are all the same, and, hence, the width of the cusps 11 of the "U"-shaped bars 9 is the same for all "U"-shaped bars 9. As illustrated in FIG. 7, to allow obtaining the provided electrical paths of the stator winding 8, the ends (in the portion of the stator winding 8 of each phase) of at least one pair 17 of legs 10 (initially not adjacent) are folded one toward the other until they touch each other to allow an electrical connection between the two ends themselves. According to an embodiment, the external folds 16 of each pair 17 of legs 10 are "U"-shaped (for example, have a width of approximately 150°) and have opposite orientations in such a way that the corresponding ends of the legs 10 touch each other. This is made possible by the fact that the legs 10 in each pair 17 of legs 10 are twisted in opposite directions by respective double folds. As illustrated in FIG. 6, in the stator winding 8 illustrated in the accompanying figures, each phase includes four pairs 17 of legs 10 (initially not adjacent) that are folded one toward the other until they touch, and, hence, overall there are twelve pairs 17 of legs 10 in the entire stator winding 8.

As shown in FIG. 9, to allow obtaining the desired electrical paths of the stator winding 8 in the portion of the stator winding 8 of each phase, the ends of at least one pair 18 of legs 10, initially not adjacent, are reciprocally electrically connected by a connection bridge 19. As illustrated in FIG. 9, in the stator winding 8 shown in the accompanying figures, each phase includes two pairs 18 of legs 10 and two corresponding connection bridges 19, and, hence, overall there are six pairs 18 of legs 10 and six corresponding connection bridges 19 in the entire stator winding 8. According to an embodiment, each connection bridge 19 consists of a flat plate that is perpendicular to the central axis of rotation 3, is "S" shaped, and has two opposite seats that engage the respective ends of the legs 10 of the pair 18 of legs 10. Moreover, according to an embodiment, all the ends of the pairs 17 of legs 10 are arranged on a same first axial level and all the ends of the pairs 18 of legs 10 together with the corresponding connection bridges 19 are arranged on a same second axial level that is arranged over the first axial level. For example, an insulating layer 20 of electrically insulating material (typically "Nomex®" brand insulating paper) that separates the ends of the legs 10 of the pairs 17 of legs 10 from the ends of the legs 10 of the pairs 18 of legs 10, is interposed between the first axial level and the second axial level.

In other words, as previously mentioned, all of the double folds of the legs 8 have the same width, equal in the embodiment illustrated in the accompanying figures to a distance corresponding to three stator slots. Hence, normally the electrical connection between two adjacent ends of two legs 10 occurs between two legs 10 that are spaced apart by six stator slots 7 (i.e., with a skip of six stator slots 7). However, there is a need for a skip of five stators slots 7 (obtained for the pairs 17 of legs 10 by the "U" folding of the ends) at every complete turn of the stator magnetic core 6, or for a skip of seven stator slots 7 (obtained for the pairs 18 of legs 10 by the connection bridges 19) in such a way to follow the electrical paths of the stator winding.

Figure 11:
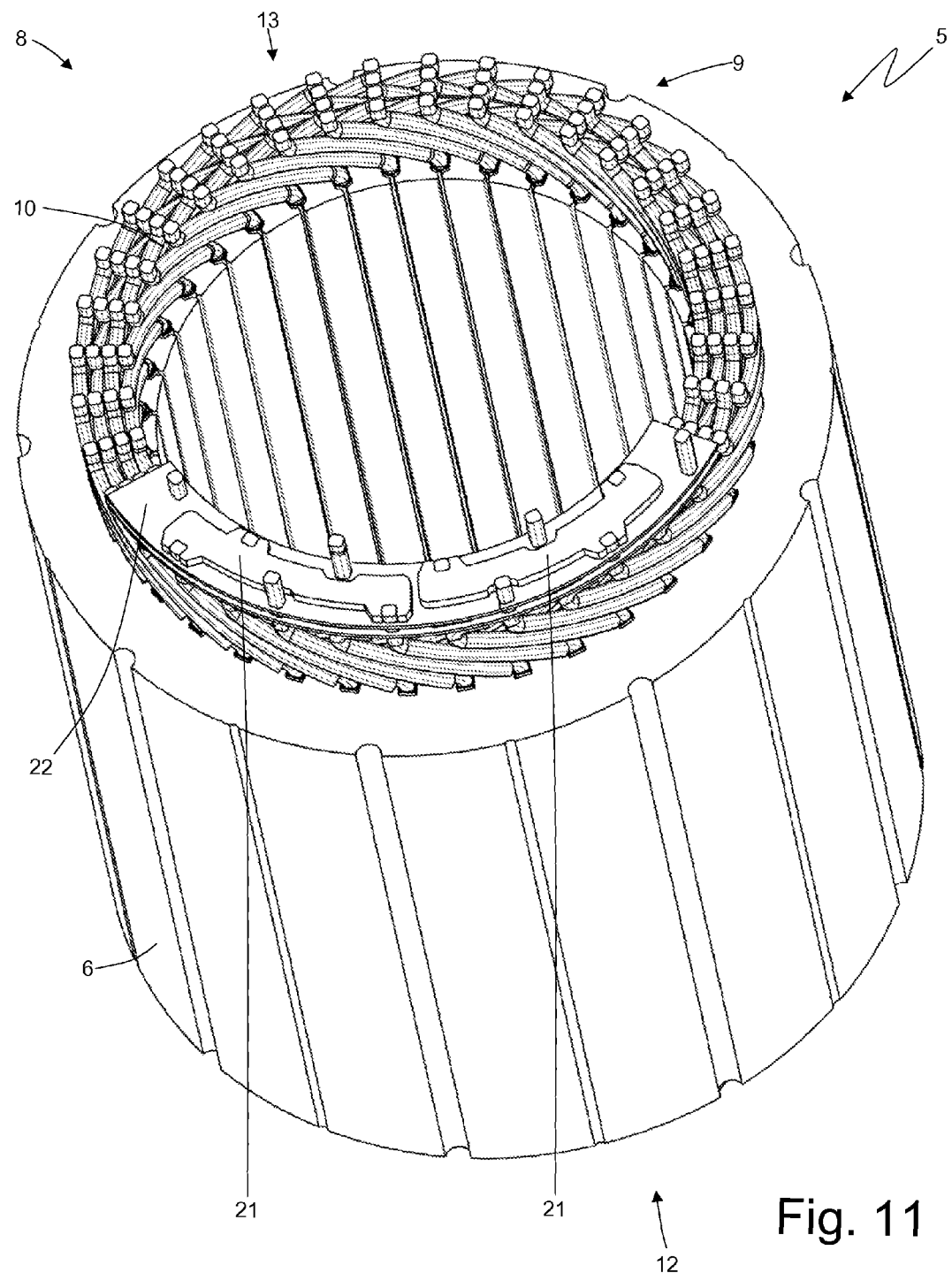

As shown in FIG. 11, the three ends of respective legs 10 that constitute a star-centre of the stator winding 8 are electrically connected to one another by a connection bridge 21, which consists of a flat plate that is perpendicular to the central axis of rotation 3 and is equipped with three seats that engage the respective ends of the legs 10. As shown in FIG. 11, in the stator winding 8 illustrated in the accompanying figures, two star connections are provided that are in turn parallel connected to each other (as is better described hereinafter). The two connection bridges 21 are arranged on a third axial level that is arranged over the second axial level of the connection bridges 19. For example, an insulating layer 22 of electrically insulating material (typically "Nomex®" brand insulating paper) that separates the two connection bridges 21 from the six connection bridges 19 is interposed between the second axial level and the third axial level.

Figure 12:
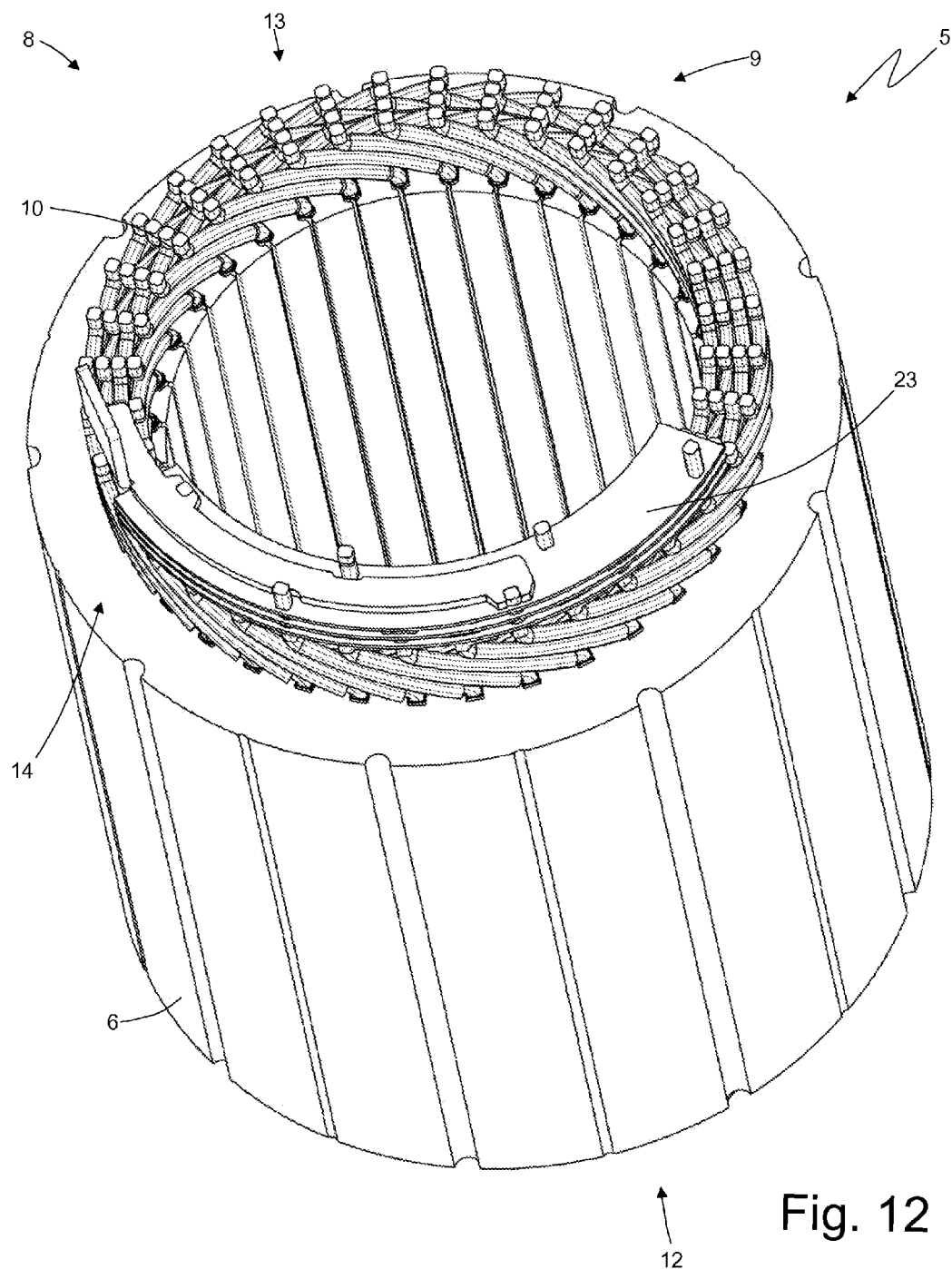
Figure 13:
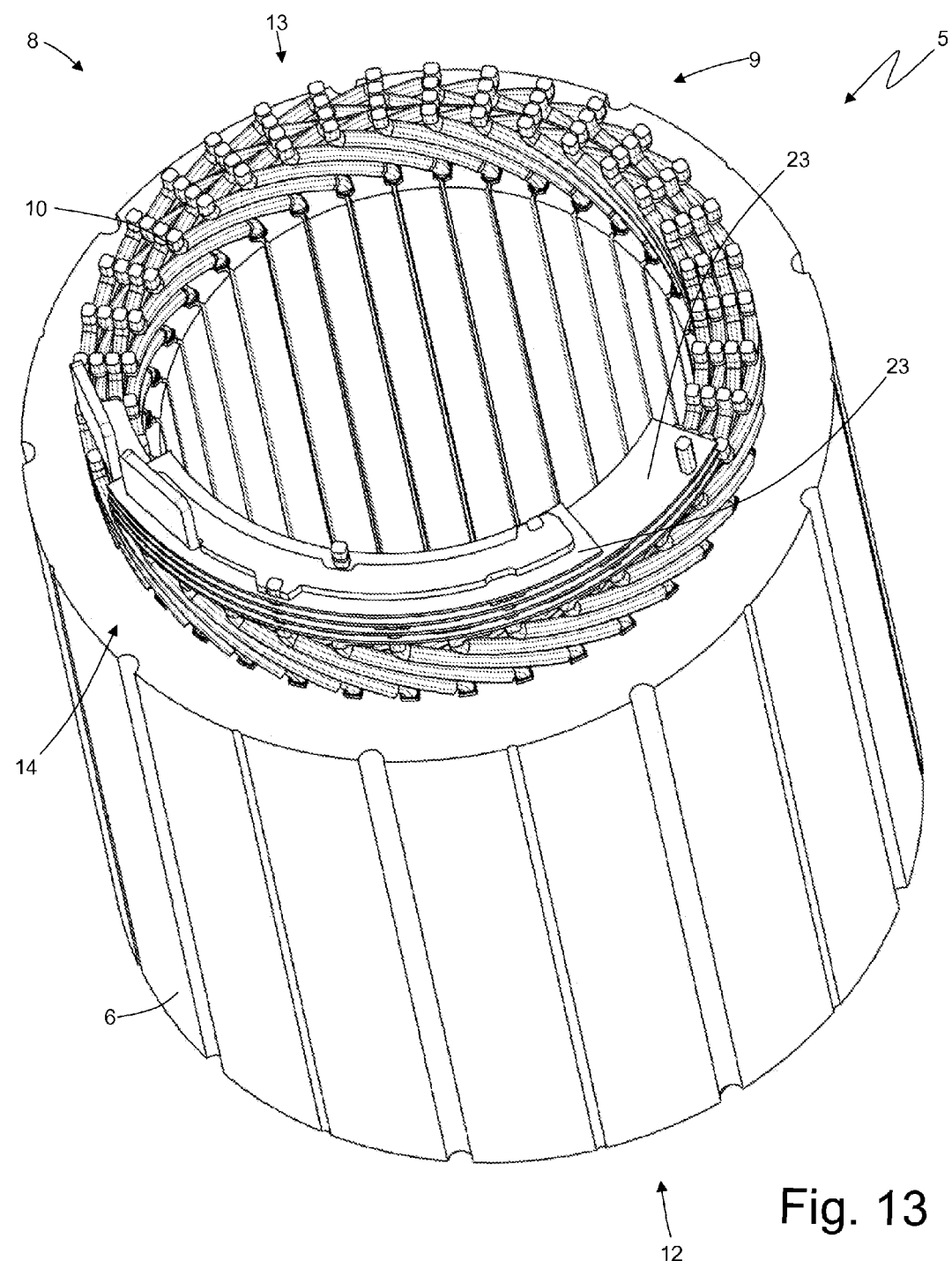
Figure 14:
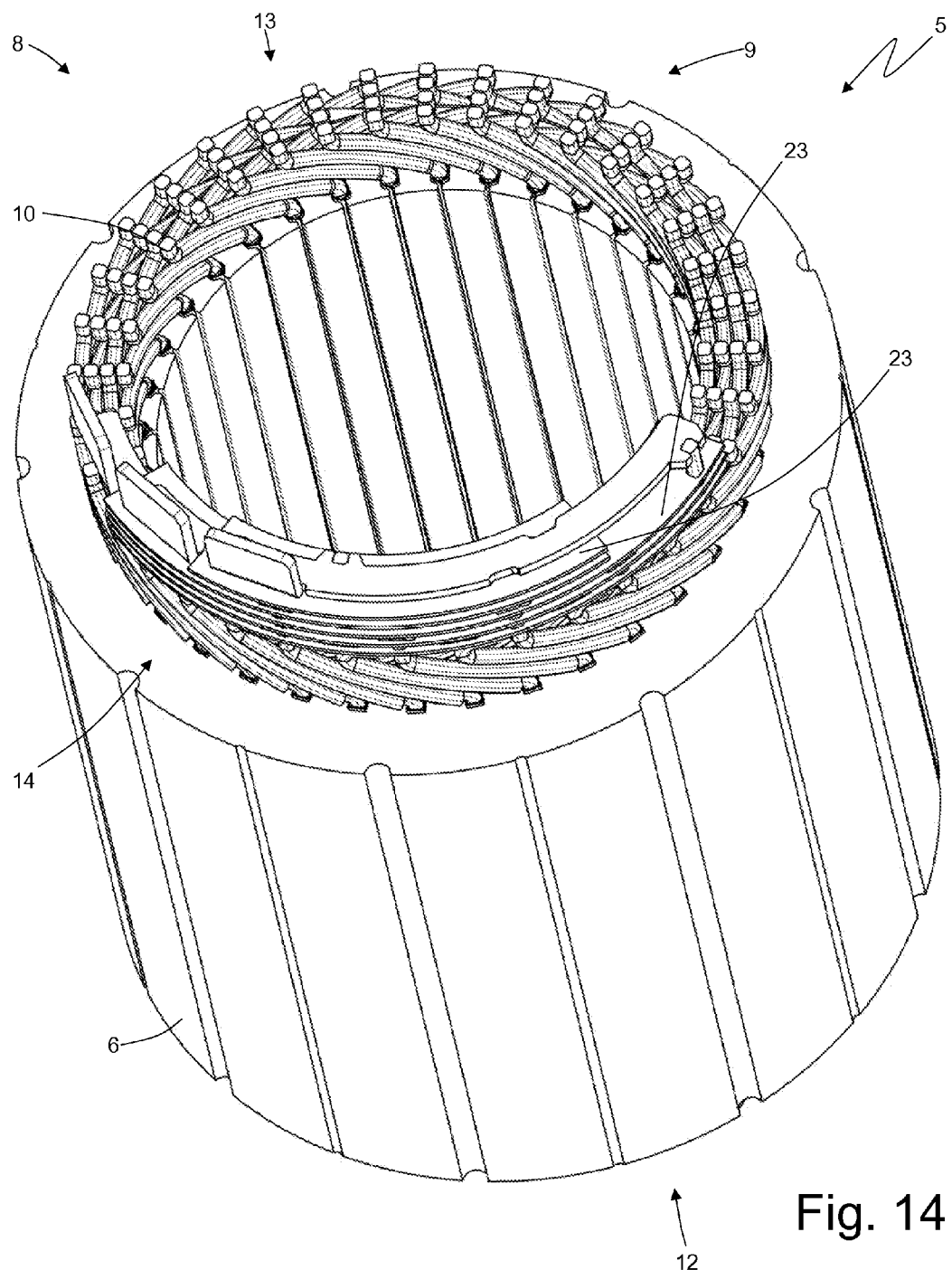

As shown in FIGS. 12-14, each connecting terminal 14 is electrically connected to the two ends of two legs 10 that constitute respective terminals of a star connection of the stator winding 8. Each connecting terminal 14 carries out part of the parallel connection of the two star connections of the stator winding 8. For example, each connecting terminal 14 consists of a transversal flat plate that is perpendicular to the central axis of rotation 3, it connects the two ends to each other of the two corresponding legs 10 and has two seats that engage the ends of the legs 10 themselves, and of an axial flat plate that is raised perpendicularly from the transversal plate, it is parallel to the central axis of rotation 3 and is used for the external connection of the synchronous electric machine 1. For example, the three transversal plates of the three connecting terminals 14 are arranged (stacked) one on the other in respective fourth axial levels arranged above the third axial level. For example, arranged below the transversal plates of the three connecting terminals 14 are three respective layers 23 of electrically insulating material (typically "Nomex®" brand insulating paper) that separate the first connecting terminal 14 from the two underlying connection bridges 21 and separate the three connecting terminals 14 from one another.

In the embodiment illustrated in FIG. 15, there is also provided a plurality of tile-shaped plates 24, each of which is made of printed plastic material (hence, electrically insulating material), it is resting at a base surface of the magnetic core 6 at the exit side 13, is arranged between two successive stator slots 7, and has a shape that replicates the curvature of the internal folds 15 of the double folds of the legs 10 of the "U"-shaped bars 9 in such a way that the legs 10 themselves are resting on tile-shaped plate 24.

As shown in FIG. 17, each tile-shaped plate 24 includes an external wall 25 that is arranged outside the stator winding 8 and has a larger dimension with respect to the existing space between two successive stator slots 7. Moreover, each tile-shaped plate 24 includes an internal element 26 that is butt-connected to the external wall 25, extends perpendicularly to the external wall 25, is rounded in shape and has a half-round transversal section. The top surface 27 of the internal element 26 replicates the curvature of the internal folds 15 of the double folds of the legs 10 of the "U"-shaped bars 9. To follow the outline of the stator slots 7, the internal element 26 of each tile-shaped plate 24 is trapezoidal-shaped in plane view, which tapers toward the middle of the stator 5.

For example, each tile-shaped plate 24 is arranged between each pair of successive stator slots 7 before twisting the legs 10 of the "U"-shaped bars 9 that protrude to the exit side 13 of the magnetic core 6. Then, the legs 10 of the "U"-shaped bars 9 that protrude to the exit side 13 of the magnetic core 6 are twisted against the tile-shaped plates 24 (for example, by resting on the top surfaces 27 of the tile-shaped plates 24).

The electric machine 1 has several advantages. For example, the electric machine 1 is simple and affordable to make as all the "U"-shaped bars 9 have the same shape and dimensions (both making the "U"-shaped bars 9 and inserting the "U"-shaped bars 9 into the stator slots 7 are greatly simplified as all the "U"-shaped bars 9 are identical and, hence, equivalent). To make the electrical paths of the stator winding 8, the specific folds are used of the ends of the pairs 17 of legs 10 and connection bridges 19 between the ends of the pairs 18 of legs 10. The electrical paths of the stator winding 8 are easily and quickly obtained and easily automatable when "U"-shaped bars 9 are all the same. In addition, by individually (i.e., one at a time) inserting the "U"-shaped bars 9 into the corresponding stator slots 7, it is possible to decrease the stresses the "U"-shaped bars 9 are subjected to during the insertion, thus avoiding possible damage to the external insulating enamel that coats the "U"-shaped bars 9 themselves. Such a result is obtained due to the fact that each "U"-shaped bar 9 is individually pushed, and, hence, it is possible both to accurately calibrate the maximum pushing force exercisable on each "U"-shaped bar 9 and apply small corrections to the pushing direction to consider certain specificities of each "U"-shaped bar 9. Instead, when all the "U"-shaped bars 9 are inserted together into the stator slots 7, the push is simultaneously exercised on all "U"-shaped bars 9, and, hence, it is possible that one or several "unfortunate" "U"-shaped bars 9 is/are subjected to an excessive push (i.e., too strong) and/or is/are improperly directed that induces damage to the external insulating enamel that covers the "U"-shaped bars 9 themselves. Moreover, the presence of the tile-shaped plates 24 improves the quality of the internal folds 15 of the double folds of the legs 10. At each internal fold 15, the leg 10 is folded against a respective tile-shaped plate 24 that accompanies and guides the deformation of the leg 10 due to the conformation of the top surface 27 thereof. The presence of the tile-shaped plates 24 prevents the legs 10, at the internal folds 15 of the double folds of the legs 10, from accidentally touching the stator magnetic core 6 against which it is easy to damage the external insulating enamel that covers the "U"-shaped bars 9.

It should be appreciated by those having ordinary skill in the related art that the electric machine and method have been described above in an illustrative manner. It should be so appreciated also that the terminology that has been used above is intended to be in the nature of words of description rather than of limitation. It should be so appreciated also that many modifications and variations of the electric machine and method are possible in light of the above teachings. It should be so appreciated also that, within the scope of the appended claims, the electric machine and method may be practiced other than as specifically described above.

What is claimed is:

1. An electric machine (1) defining a substantially central axis (3) of rotation, said electric machine comprising:
   a stator (5) including a magnetic core (6) crossed substantially longitudinally by a plurality of stator slots (7); and
   a stator winding (8) including at least one phase and series of rigid bars (9) that are substantially "U"-shaped and inserted through said stator slots (7) defining an entry side (12) in which cusps (11) of said bars (9) are placed and an exit side (13) in which legs (10) of said bars (9) are placed;
   wherein said legs (10) coming out said exit side (13) are twisted through corresponding double folds each of which defines an internal fold (15) in one direction and an external fold (16) in a opposite direction, ends of said legs (10) are electrically connected to each other to form electrical paths of said stator winding (8), a width of said cusps (11) is substantially identical for said bars (9);
   wherein said legs (10) comprises at least a first pair (17) of said legs (10) in a part of said stator winding (8) of said phase, said first pair (17) of said legs (10) have respective first ends;
   wherein the other said legs (10) that are different from the first pair (17) of said legs (10) have respective second ends that are axially oriented to be parallel to each other in an axial direction; and
   wherein only said first ends are folded toward each other to be arranged parallel to each other in a circumferential direction so that said first ends touch each other to allow an electrical connection between said first ends and so that said first ends are oriented perpendicular to said second ends.

2. An electric machine (1) as set forth in claim 1, wherein said external folds (16) of said first pair (17) of said legs (10) are substantially "U"-shaped and have substantially opposite orientation with respect to each other so that corresponding said ends touch each other and are substantially parallel to one another in said circumferential direction.

3. An electric machine (1) as set forth in claim 1, wherein in said stator winding (8) of said phase, ends of at least a second pair (18) of said legs (10), initially not adjacent with respect to each other, are electrically connected to each other by a first connection bridge (19).

4. An electric machine (1) as set forth in claim 3, wherein said first connection bridge (19) is made of a first substantially flat plate that is substantially perpendicular to said central axis (3).

5. An electric machine (1) as set forth in claim 3, wherein said ends of said first pair (17) of legs (10) are arranged on a first axial level and said ends of said second pair (18) of legs (10) and corresponding said first connection bridges (19) are arranged on a second axial level placed over said first axial level.

6. An electric machine (1) as set forth in claim 5, wherein a first insulating layer (20) of electrically insulating material is interposed between said first and second axial levels.

7. An electric machine (1) as set forth in claim 3, wherein said ends of corresponding said legs (10) forming a center-star of said stator winding (8) are electrically connected to each other by a second connection bridge (21).

8. An electric machine (1) as set forth in claim 7, wherein said second connection bridge (21) is made by a second substantially flat plate that is substantially perpendicular to said central axis (3).

9. An electric machine (1) as set forth in claim 7, wherein said second connection bridge (21) is arranged on a third axial level placed over said second axial level.

10. An electric machine (1) as set forth in claim 9, wherein a second insulating layer (22) of electrically insulating material is interposed between said second and third axial levels.

11. An electric machine (1) as set forth in claim 7, wherein said electric machine comprises further at least one connecting terminal (14) electrically connected to at least one of said ends of corresponding said leg (10), forming a terminal of a star-connection of said stator winding (8).

12. An electric machine (1) as set forth in claim 11, wherein said connecting terminal (14) consists of a third substantially flat plate that is substantially perpendicular to said central axis (3) and a fourth substantially flat plate that rises substantially perpendicular to said third plate and is arranged substantially parallel to said central axis (3).

13. An electric machine (1) as set forth in claim 12, wherein said third plate of said connecting terminal (14) is arranged on another said third plate of another said connecting terminal (14) on corresponding fourth axial levels placed over said third axial level.

14. An electric machine (1) as set forth in claim 12, wherein said third plate of said connecting terminal (14) is electrically connected to said legs (10) that form corresponding terminals of corresponding said star-connections of said stator winding (8) and are connected to each other substantially in parallel.

15. A method of construction of an electric machine (1) including a stator (5) having a magnetic core (6) crossed substantially longitudinally by a plurality of stator slots (7) and a stator winding (8) having at least one phase and series of rigid bars (9) that are substantially "U"-shaped and inserted through the stator slot (7) defining an entry side (12) in which cusps (11) of the bars (9) are placed and an exit side (13) in which legs (10) of the bars (9) are placed, said method comprising steps of:

twisting the legs (10) coming out the exit side (13) through corresponding double folds each of which defines an internal fold (15) in one direction and an external fold (16) in a substantially opposite direction;

electrically connecting ends of the legs (10) to each other to form electrical paths of the stator winding (8);

carrying out the bars so that a width of the cusps (11) is substantially identical for the bars (9);

selecting in said legs (10) at least a first pair (17) of said legs (10) in a part of said stator winding (8) of said phase, said first pair (17) of said legs (10) have respective first ends;

folding respective second ends of the other said legs (10) that are different from the first pair (17) of said legs (10) so that the second ends are parallel to each other in an axial direction; and folding only the first ends, initially not adjacent with respect to each other, toward each other to be arranged parallel to each other in a circumferential direction so that the first ends touch each other to allow an electrical connection between the first ends and so that said first ends are oriented perpendicular to said second ends.

\* \* \* \* \*